United States Patent
Werner et al.

(10) Patent No.: US 8,688,330 B2
(45) Date of Patent: Apr. 1, 2014

(54) OPERATOR CONTROL METHOD AND OPERATOR CONTROL DEVICE FOR A VEHICLE

(71) Applicants: Volkswagen AG, Wolfsburg (DE); Hella KGAA Hueck & Co., Lippstadt (DE)

(72) Inventors: Stefan Werner, Bocholt (DE); Lothar Scharwald, Lippstadt (DE); Dietmar Grave, Meine (DE); Andreas Thiele, Wolfsburg (DE)

(73) Assignees: Volkswagen Aktiengesellschaft, Wolfsburg (DE); Hella KGAA Hueck & Co., Lippstadt (DE)

(*) Notice: Subject to any disclaimer, the term of this patent is extended or adjusted under 35 U.S.C. 154(b) by 0 days.

(21) Appl. No.: 13/668,615

(22) Filed: Nov. 5, 2012

(65) Prior Publication Data

US 2013/0060431 A1    Mar. 7, 2013

Related U.S. Application Data

(63) Continuation of application No. PCT/EP2011/002004, filed on Apr. 20, 2011.

(30) Foreign Application Priority Data

May 5, 2010 (DE) .......... 10 2010 019 362

(51) Int. Cl.
     *B60R 22/00*      (2006.01)
     *B60N 2/02*      (2006.01)

(52) U.S. Cl.
     CPC .............. *B60N 2/0228* (2013.01); *B60N 2/0224* (2013.01); *B60N 2/0244* (2013.01); *B60N 2/0248* (2013.01); *B60N 2/0296* (2013.01)
     USPC .............. 701/49; 701/36; 340/562; 340/5.61; 340/5.72; 340/545.7; 340/438; 324/661; 324/686; 324/679; 324/658; 70/327; 70/278.1; 318/272; 318/286; 73/862

(58) Field of Classification Search
     CPC .. B60N 2/0228; B60N 2/0224; B60N 2/0244; B60N 2/0248; B60N 2/0296
     USPC .................... 340/562, 5.61, 5.72, 545.7, 438; 324/661, 686, 679, 658; 70/327, 278.1; 318/272, 286; 701/36, 49; 73/862
     See application file for complete search history.

(56) References Cited

U.S. PATENT DOCUMENTS 6,095,553 A * 8/2000 Chou et al. .................... 280/735
6,095,554 A * 8/2000 Foo et al. ..................... 280/735
(Continued)

FOREIGN PATENT DOCUMENTS

DE      102 55 439 A1    6/2004
DE   10 2007 040 775 A1   3/2009
(Continued)

*Primary Examiner* — Calvin Cheung
(74) *Attorney, Agent, or Firm* — Muncy, Geissler, Olds & Lowe, P.C.

(57) ABSTRACT

A first operator control function is activated if it is detected by means of a first sensor that a first physical variable is higher than a predetermined first threshold value. In a similar way, a second operator control function is activated if it is detected by means of a second sensor that a second physical variable is higher than a predetermined second threshold value. A third operator control function is activated if it is detected by means of the first sensor that the first physical variable is higher than a predetermined third threshold value and if at the same time it is detected by means of the second sensor that the second physical variable is higher than a predetermined fourth threshold value, the third threshold value being higher than the first threshold value.

10 Claims, 2 Drawing Sheets

(56) References Cited

U.S. PATENT DOCUMENTS

| | | | |
|---|---|---|---|
| 6,553,295 B1* | 4/2003 | Bauch et al. | 701/45 |
| 6,936,983 B2* | 8/2005 | Kachouh et al. | 318/272 |
| 7,126,453 B2* | 10/2006 | Sandau et al. | 340/5.61 |
| 7,205,777 B2* | 4/2007 | Schulz et al. | 324/661 |
| 7,438,330 B2* | 10/2008 | Takahashi | 292/201 |
| 7,501,595 B2* | 3/2009 | Dimig et al. | 200/61.62 |
| 7,521,818 B2* | 4/2009 | Bergmann et al. | 307/10.2 |
| 2002/0039092 A1* | 4/2002 | Shigetaka | 345/156 |
| 2002/0157435 A1* | 10/2002 | Wicker | 70/237 |
| 2003/0029210 A1* | 2/2003 | Budzynski et al. | 70/278.1 |
| 2005/0219043 A1* | 10/2005 | Pollmann et al. | 340/426.28 |
| 2006/0055534 A1* | 3/2006 | Fergusson | 340/562 |
| 2006/0132332 A1* | 6/2006 | Ono | 341/33 |
| 2006/0138866 A1* | 6/2006 | Bergmann et al. | 307/10.5 |
| 2006/0143857 A1 | 7/2006 | Freyholdt et al. | |
| 2007/0113481 A1* | 5/2007 | Kato et al. | 49/360 |
| 2007/0115096 A1* | 5/2007 | Suzuki et al. | 340/5.72 |
| 2007/0171057 A1* | 7/2007 | Ogino et al. | 340/545.7 |
| 2007/0176737 A1* | 8/2007 | Friese | 340/5.61 |
| 2008/0234895 A1* | 9/2008 | Veerasamy | 701/36 |
| 2008/0297076 A1* | 12/2008 | Sakai et al. | 318/286 |
| 2009/0039902 A1* | 2/2009 | Hargreaves et al. | 324/686 |
| 2009/0133510 A1* | 5/2009 | Witte et al. | 73/862.626 |
| 2009/0198420 A1* | 8/2009 | Newman et al. | 701/49 |
| 2009/0198455 A1* | 8/2009 | Bricker | 702/36 |
| 2009/0230700 A1* | 9/2009 | Arabia et al. | 292/93 |
| 2009/0271077 A1* | 10/2009 | Goodrich et al. | 701/49 |
| 2009/0295556 A1* | 12/2009 | Inoue et al. | 340/438 |
| 2010/0148806 A1* | 6/2010 | Hargreaves et al. | 324/679 |
| 2010/0171515 A1* | 7/2010 | Nakagawa et al. | 324/658 |
| 2013/0194069 A1* | 8/2013 | Baudru et al. | 340/5.72 |

FOREIGN PATENT DOCUMENTS

| | | |
|---|---|---|
| EP | 1 621 420 A1 | 2/2006 |
| EP | 1 507 943 B1 | 7/2007 |

* cited by examiner

OPERATOR CONTROL METHOD AND OPERATOR CONTROL DEVICE FOR A VEHICLE

This nonprovisional application is a continuation of International Application No. PCT/EP2011/002004, which was filed on Apr. 20, 2011, and which claims priority to German Patent Application No. DE 10 2010 019 362.3, which was filed in Germany on May 5, 2010, and which are both herein incorporated by reference.

BACKGROUND OF THE INVENTION

1. Field of the Invention

The present invention relates to an operator control method for activating an operator control function and an operator control device for activating this operator control function for a vehicle as well as a vehicle equipped in a corresponding manner.

2. Description of the Background Art

It is known from DE 10 2007 040 775 A1 to activate a certain operator control function when an unlocking sensor and a locking sensor of a vehicle are actuated at the same time.

In the conventional art, however, a malfunction frequently occurs when an unlocking sensor and a locking sensor are accidentally actuated at the same time.

SUMMARY OF THE INVENTION

It is therefore an object of the present invention to reduce a frequency of an accidental activation of the specific operator control function.

Within an embodiment of the present invention an operator control method for a vehicle is provided. A first operator control function is activated thereby if it is detected with the aid of a first sensor of the vehicle that a first physical variable (for example, a capacity, an inductivity, a magnetic field variable, a light intensity, a signal propagation time or an extent (distance) of a displacement of an operator control element) is higher than a predetermined first threshold value. In a similar manner a second operator control function is activated if it is detected with the aid of a second sensor of the vehicle that a second physical variable is higher than a predetermined second threshold value. It is also possible within the scope of the invention that the first (second) operator control function is activated if it is detected with the aid of the first (second) sensor that the first (second) physical variable is lower than the predetermined first (second) threshold value or if it is detected with the aid of the first (second) sensor that a change of the first (second) physical variable is higher than the predetermined first (second) threshold value. A third operator control function is activated if it is detected with the aid of the first sensor that the first physical variable is higher than a predetermined third threshold value and if at the same time it is detected with the aid of the second sensor that the second physical variable is higher than a predetermined fourth threshold value. The third threshold value is thereby higher than the first threshold value. In turn, the third operator control function can also be activated if it is detected with the aid of the first sensor that the first physical variable is lower than the predetermined third threshold value (or that a change of the first physical variable is higher than the predetermined third threshold value), if at the same time it is detected with the aid of the second sensor that the second physical variable is lower than the predetermined fourth threshold value (or that a change of the second physical variable is higher than the predetermined fourth threshold value). When a reduction of the first or second physical variable is to be detected by the sensors for the activation of the third operator control function, the third threshold value is lower than the first threshold value.

In other words, the present invention avoids an accidental activation of the third operator control function in that at least the sensitivity of the first sensor is reduced compared to a sensitivity during a detection of the corresponding physical variable for the activation of the first operator control function. Depending on how the first sensor operates, the reduction of the sensitivity can lie in that the third threshold value is increased or reduced compared to the first threshold value, which depends on whether the first sensor detects an actuation via a reduction or an increase of the first physical variable.

The second sensor can also be a device that detects the actuation of an operator control element (for example, of a door handle). In this case, the second operator control function is activated when a displacement of the corresponding operator control element is higher than the predetermined second threshold value, which can also be detected, for example, via a type of switch that is actuated when, e.g., the door handle of a vehicle is pulled out correspondingly far. When the second sensor is realized quasi as a type of switch, the second threshold value corresponds to the fourth threshold value, which means that the mode of operation of the switch (the sensitivity of the switch) for the activation of the second operator control function and for the activation of the third operator control function is the same.

Due to the dynamic trigger threshold (first or third threshold value) of the first sensor, an adjustment to different cases of use is possible, so that trigger thresholds of different levels apply to the different cases of use. Due to different sensor sensitivities between a simple sensor function (activation of the first operator control function) and a sensor function that is activated by a series of actions (activation of the third operator control function), the present invention can be adapted advantageously to different requirement profiles. The change of the sensitivity of the first sensor can thereby be established via the distance between the first and the third threshold value.

In an embodiment according to the invention, the first and the second sensor is a capacitive sensor and thus the first and the second physical variable is a capacity. However, according to the invention it is also possible that only the first or only the second sensor is a capacitive sensor.

Since capacitive sensors are used, for example, to unlock or lock a vehicle that is equipped with a keyless entry system, these sensors advantageously can also be used to activate the third operator control function.

Advantageously, the fourth threshold value can be equal to the second threshold value.

Further, the sensitivity of the second sensor for the activation of the third operator control function can also be changed. However, there are advantages, for example, a lower complexity, if only the sensitivity of the first sensor for the activation of the third operator control function is increased. This applies in particular when the second sensor is realized as a type of switch, as already stated at the outset.

The first sensor and the second sensor can be attached to the vehicle such that both sensors can be easily activated at the same time by one operator, i.e. for example, using only one hand.

In order that the third operator control function can be easily activated by the same operator, it is an advantage if the two sensors are located close to one another in terms of location.

For example, it is possible that the first as well as the second sensor is attached to an outer door handle of the vehicle.

It is possible thereby that the first operator control function of an automatic locking system corresponds to a door assigned to the outer door handle or an automatic locking system of the entire vehicle. In this case the second operator control function can correspond to an automatic unlocking of this door or to an automatic unlocking of the entire vehicle, while the third operator control function corresponds to an automatic opening of at least one closing element of the vehicle. The at least one closing element can thereby comprise all windows and sliding roofs of the vehicle to be opened automatically so that with an activation of the third operator control function, all of the windows and sliding roofs of the vehicle are opened automatically.

An activation of one of the operator control functions, however, is in particular possible only when beforehand an authorized ID transmitter or a remote for a keyless entry system of the vehicle is detected.

In an embodiment, an operator control device for a vehicle is also provided. The device can include a control, a first sensor and a second sensor. The device is configured such that the control automatically activates a first operator control function if it detects via the first sensor that a first physical variable is higher than a predetermined first threshold value. In a similar manner the control automatically activates a second operator control function if it detects via the second sensor that a second physical variable is higher than a predetermined second threshold value. Furthermore, the device is configured such that the control automatically activates a third operator control function if it detects with the aid of the first sensor that the first physical variable is higher than a predetermined third threshold value and if at the same time it detects by means of the second sensor that the second physical variable is higher than a predetermined fourth threshold value. The third threshold value is thereby higher than the first threshold value.

In a similar manner as with the method according to the invention it is also possible that the first (second) operator control function is activated if the first (second) sensor detects that the first (second) physical variable is lower than the predetermined first (second) threshold value or that a change of the first (second) physical variable is higher than the predetermined first (second) threshold value. The important factor is that the sensitivity of the first sensor for the activation of the third operator control function via the adjustment of the third threshold value is adjusted to be lower than is the case for the activation of the first operator control function (depending on the first threshold value).

The advantages of the operator control device according to the invention correspond essentially to the advantages of the method according to the invention, which were explained in detail at the beginning, so that a repetition is omitted here.

Further, a vehicle is provided with an operator control device according to an embodiment of the invention.

A new operator control function of a vehicle can be realized with the present invention without a new sensor also being needed for this purpose.

The present invention is in particular suitable for the activation of an operator control function for a vehicle via sensors attached to the vehicle outside. Naturally, the present invention is not limited to this preferred field of application, however, since the present invention, on the one hand, can also be used with sensors attached in the interior of the vehicle and since the present invention, on the other hand, can also be used with aircraft, ships and rail-mounted vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
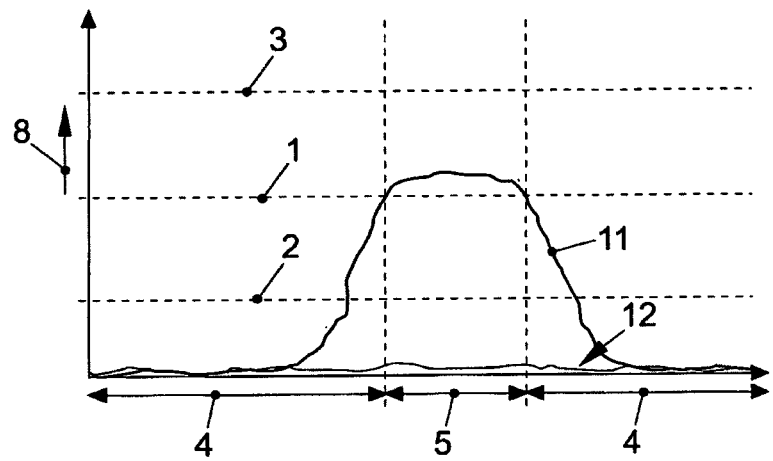
FIG. 1 illustrates a signal course of a signal for the activation of a vehicle locking system detected by a sensor.
Figure 4:
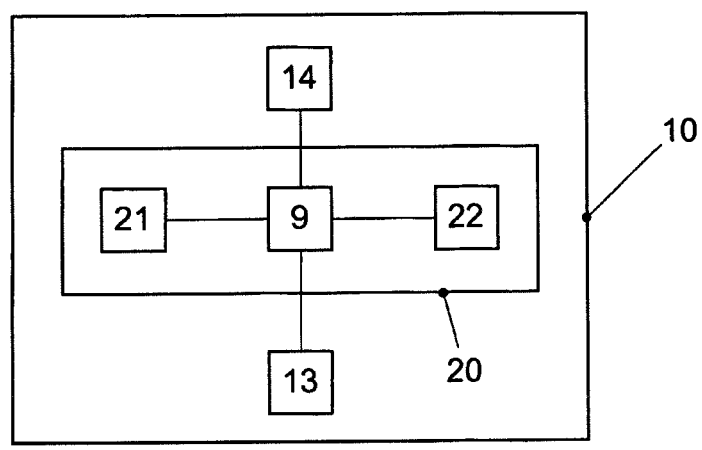
FIG. 4 shows diagrammatically a vehicle according to an embodiment the invention with an operator control device.

FIG. 1 shows a signal course 11 for the activation of a locking system of a vehicle. A first sensor (locking sensor) 21 shown in FIG. 4 is arranged at a specific location outside on a door handle of the vehicle, while a second sensor (unlocking sensor) 22 likewise shown in FIG. 4 is arranged on an inside of this door handle. In FIG. 1 the signal courses 11, 12 of the two sensors 21, 22 are shown over time, wherein a capacity 8 detected by the respective sensor 21, 22 is shown, since the sensors 21, 22 are capacitive sensors. The broken lines 1-3 running horizontally in FIG. 1 represent a first threshold value 1, a second threshold value 2 and a third threshold value 3. In FIG. 1 the capacitance course 11 of the first sensor 21 in a time interval shown by the reference number 5 exceeds the first threshold value 1, which leads to a locking signalization. This locking signalization leads to a locking of the vehicle when at the same time an ID transmitter authorized for this vehicle is detected by a keyless entry system of the vehicle. Since at the time intervals designated by reference number 4 the capacity 11 detected by the first sensor is not higher than the first threshold value 1 nor is the capacity 12 detected by the second sensor 22 higher than the second threshold sensor 2, no signalization takes place at these time intervals 4.

Figure 2:
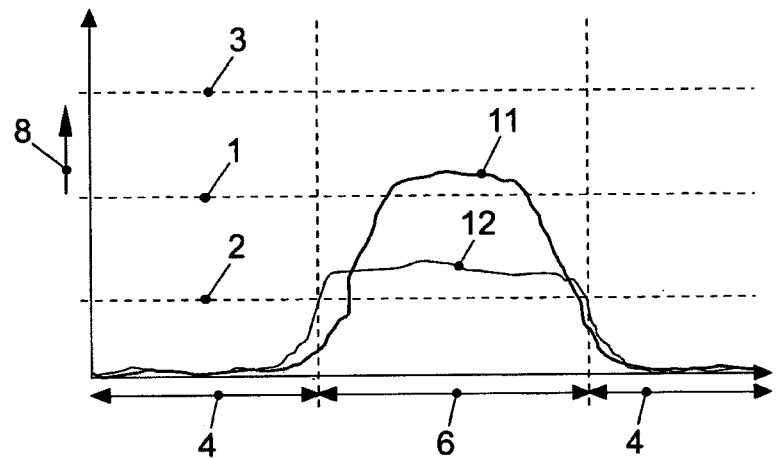
FIG. 2 illustrates a signal course of a signal for the activation of a vehicle unlocking system detected by a sensor.

FIG. 2 in its structure (for example, regarding threshold value 1-3) corresponds to FIG. 1, wherein different signal courses 11, 12 of the two sensors 21, 22 are shown in FIG. 2. In the case shown in FIG. 2, the first sensor 21 and the second sensor 22 were actuated at the same time. For the time interval designated by reference number 6, the capacitance course 12 detected by the second sensor 22 exceeds the second threshold value 2, whereby an unlocking signalization of the vehicle takes place, during which the vehicle is unlocked if the corresponding authorized ID transmitter is detected at the same time. The simultaneous exceeding of the first threshold value 1 by the signal course 11 of the first sensor 21 in this case is suppressed, since the signal course 11 never exceeds the third threshold value 3.

It should be noted that prior art devices would have activated the third operator control function in a disadvantageous manner during the time interval in which the signal course 11 of the first sensor 21 is higher than the first threshold value 1 and the signal course 12 of the second sensor 22 is higher than the second threshold value 2.

Figure 3:
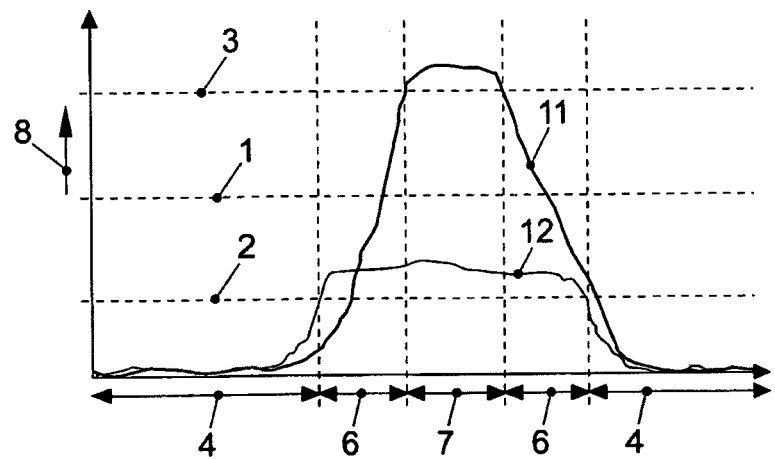
FIG. 3 illustrates a signal course of two signals for the activation of a third operator control function respectively detected by a sensor.

FIG. 3 also corresponds in its structure to the FIG. 1 and thus to FIG. 2. However, the signal course 11 of the first sensor 21 also exceeds in FIG. 3 for the interval 7 the third threshold value 3. Since the signal course 12 of the second sensor 22 during this time interval 7 exceeds the second threshold value 2, this leads to a comfort opening signalization if in turn the authorized ID transmitter is detected at the same time. This comfort opening opens all of the windows and sliding roofs of the vehicle as long as the first capacitive sensor 21 detects a capacity higher than the third threshold value 3 and the second capacitive sensor 12 detects a capacity higher than the second threshold value 2.

As the first threshold value 1 applies for the locking, a high sensitivity for the simple locking instruction by actuation of the locking sensor on the outer door handle is ensured, so that even an actuation with gloves is easily possible. A comfort opening function that is nevertheless immune to interference is ensured in that the third threshold value applies for the activation of the comfort opening function. Thus an accidental actuation of the locking sensor (e.g., during the unlocking of the vehicle) as a rule does not lead to the locking or the comfort opening of the vehicle.

In other words, the locking sensor 22 reacts to the simple locking instruction with a high sensitivity (first threshold value 1), so that the vehicle can be locked via the locking sensor 21 even when thick gloves are worn. Nevertheless, accidental opening or opening due to defects of the windows and the sliding roof is avoided by the comfort opening function.

Before and after the time interval 7 a time interval 6 exists in FIG. 3, in which although the second sensor 22 detects a capacity above the second threshold value 2, in which however the capacity 11 detected by the first sensor 21 is below the third threshold value 3. This constellation leads to an unlocking signalization as has already been explained with respect to FIG. 2. Since with the time intervals 4 the first sensor 21 detects a capacity 11 below the first threshold value 1 and the second sensor 22 detects a capacity 12 below the second threshold value 2, there is no signalization at the time intervals 4.

FIG. 4 shows diagrammatically a vehicle 10 according to the invention, which, in addition to an operator control device 20, comprises a window 13 and a door 14. The operator control function 20 in turn comprises for its part a control 9, a locking sensor 21 and an unlocking sensor 22. The unlocking sensor 22 is thereby arranged on the inside of a door handle of the door 14 and the locking sensor 21 is arranged on the outside of this door handle. When the locking sensor 21 is actuated such that the third threshold value is exceeded, and when at the same time the unlocking sensor 22 is actuated such that the first threshold value 1 is exceeded, the control 9 detects this and within the scope of a comfort opening opens the window 14 of the vehicle 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An operator control method for a vehicle, the method comprising:

activating, by a control, a first operator control function if it is detected via a first sensor that a first physical variable is higher than a predetermined first threshold value;

activating, by the control, a second operator control function if it is detected via a second sensor that a second physical variable is higher than a predetermined second threshold value; and activating, by the control, a third operator control function if it is detected via the first sensor that the first physical variable is higher than a predetermined third threshold value and if at the same time it is detected via the second sensor that the second physical variable is higher than a predetermined fourth threshold value and that the third threshold value is higher than the first threshold value, wherein a sensitivity of the first sensor is variable and a change in the sensitivity is established based on a difference between the first threshold value and the third threshold value.

2. The method according to claim 1, wherein the first sensor is a capacitive sensor and the first physical variable is a capacity, or wherein the second sensor is a capacitive sensor and the second physical variable is a capacity.

3. The method according to claim 1, wherein the fourth threshold value is equal to the second threshold value.

4. The method according to claim 1, wherein the first sensor and the second sensor are attached adjacently to the vehicle such that the two sensors are configured to be activated at substantially the same time by one operator.

5. The method according to claim 1, wherein the first sensor and the second sensor are attached to an outer door handle of the vehicle.

6. The method according to claim 5, wherein the first operator control function is a door of the vehicle assigned to an outer door handle that is automatically locked, and wherein the second operator control function is the door that is automatically unlocked, and wherein the third operator control function is at least one closing element of the vehicle that is automatically opened.

7. The method according to claim 6, wherein the third operator control function includes that all windows and sliding doors of the vehicle are opened automatically.

8. The method according to claim 6, wherein the at least one closing element is opened only when beforehand an authorized ID transmitter is detected.

9. An operator control device for a vehicle, the device comprising:

a control;

a first sensor; and a second sensor, wherein the control automatically activates a first operator control function if the first sensor detects that a first physical variable is higher than a predetermined first threshold value, wherein the control automatically activates a second operator control function if the second sensor detects that a second physical variable is higher than a predetermined second threshold value, and wherein the control automatically activates a third operator control function if the first sensor detects that the first physical variable is higher than a predetermined third threshold value and if at substantially a same time the second sensor detects that the second physical variable is higher than a predetermined fourth threshold value and that the third threshold value is higher than the first threshold value, and wherein a sensitivity of the first sensor is variable and a change in the sensitivity is established based on a difference between the first threshold value and the third threshold value.

10. A vehicle locking system, comprising:

a control;

a first capacitive sensor arranged on an exterior of an outer door handle of a vehicle;

a second capacitive sensor arranged on an interior of the door handle;

wherein the control automatically locks the vehicle if the first sensor detects that a first physical variable is higher than a predetermined first threshold value, wherein the control automatically unlocks the vehicle if the second sensor detects that a second physical variable is higher than a predetermined second threshold value, wherein the control automatically opens a window on the vehicle if the first sensor detects that the first physical variable is higher than a predetermined third threshold value and if at substantially a same time the second sensor detects that the second physical variable is higher than a predetermined fourth threshold value and that the third threshold value is higher than the first threshold value, and wherein a sensitivity of the first sensor is variable and a change in the sensitivity is established based on a difference between the first threshold value and the third threshold value.

\* \* \* \* \*